Sept. 10, 1940.                W. B. STEWART                2,214,032
              APPARATUS FOR ADMINISTERING POWDERED ALUMINUM
                         Filed June 23, 1939
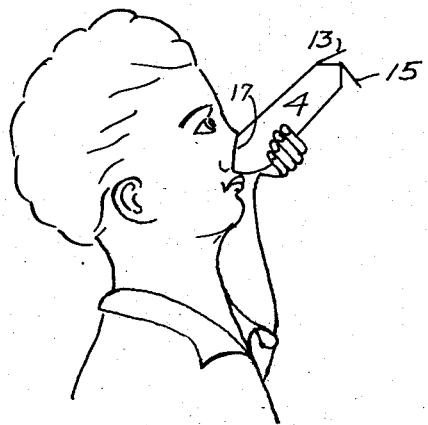
FIG. 1
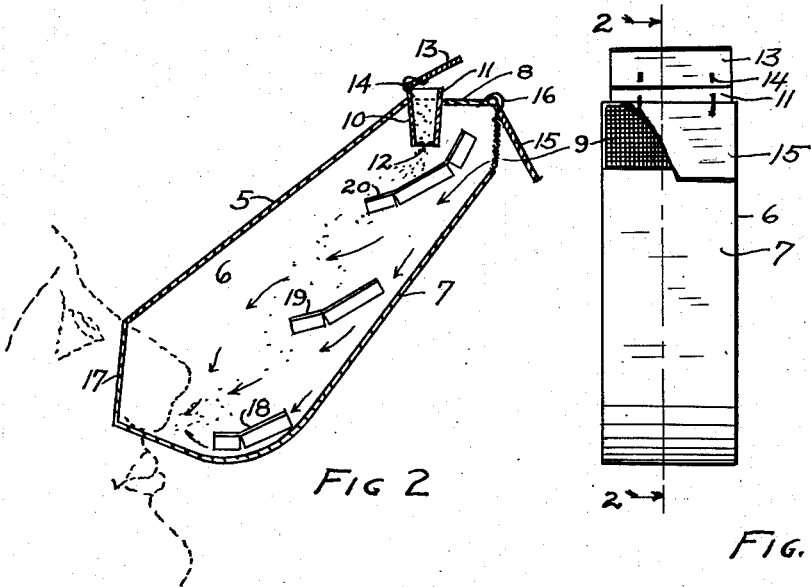
FIG 2
FIG. 3
                                          INVENTOR.
                                    WALTER B. STEWART
                              BY
                                          ATTORNEY.

Patented Sept. 10, 1940

2,214,032

UNITED STATES PATENT OFFICE 2,214,032

APPARATUS FOR ADMINISTERING POWDERED ALUMINUM

Walter B. Stewart, Denver, Colo.

Application June 23, 1939, Serial No. 280,778

6 Claims. (Cl. 128—266)

This invention relates to a method and apparatus for administering powdered aluminum.

It has long been well known that miners, stonemasons, sandblasters and others who are obliged to work in an atmosphere containing fine silica dust, become the victims of a pulmonary disease known as silicosis.

Autopsies of persons who die from this disease and an examination of their lungs show big areas of a sort of fibrous development. Examinations of the lung contents invariably disclosed the presence of silica dust and hence the name.

Silicon (Si) dissolves when subjected to the action of water and oxygen forming silicic acid, either ortho or meta, which is very harmful to animal tissues and when formed in the lungs it results in the building up of fibrous patches that finally cause the patient's death.

In an attempt to remove the danger of acquiring silicosis several methods have been tried. The mines have been sprayed with water in an effort to remove the dust from the air; and masks or other filters have been used to remove the dust particles from the air before it is inhaled.

It has been found that neither of these methods can be relied upon to prevent the danger of acquiring silicosis.

It has been discovered that it is only the fine particles that enter the lungs even if no protective measures are taken and particles so fine that they are not laid by a water spray or removed by a mask are the ones that do the damage.

Since workmen who were compelled to breathe air laden with other kinds of dust did not develop silicosis, it appeared that it was not the presence of dust alone, but the presence of silicon to which the disease was due. Silicon is chemically active and readily soluble in the presence of air and water.

If it were possible to render the silica dust insoluble or to coat it with an insoluble substance, it could be rendered as harmless as coal dust.

Applicant being himself a victim of this disease and pronounced incurable found that by breathing fine aluminum dust he began to improve and finally recovered.

Aluminum, when subjected to the action of water and oxygen, is converted into aluminum hydroxide, Al(OH)$_3$, which is insoluble and it is probable that the inhalation of aluminum dust produced sufficient aluminum hydroxide to coat the silicon particles and stop their further conversion into silicic acid.

In order to enable workmen who are exposed to danger from silica or silicon dust to inhale in addition a quantity of powdered aluminum, a simple and a conveniently usable apparatus is necessary and one of the objects of this invention is the production of such an apparatus.

In order to describe the apparatus and explain its manner of use, reference will now be had to the accompanying drawing in which such an apparatus has been illustrated, and in which:

Figure 1 is a view showing the manner in which the apparatus is employed for administering powdered aluminum;

Figure 2 is a section taken on line 2—2, Figure 3, and shows the interior construction of the apparatus; and Figure 3 is an elevation looking in the direction of arrow 3, in Figure 2.

In order to effect the administration of aluminum powder conveniently and economically, the apparatus illustrated on the drawing has been devised and designed especially for individual use and will now be described.

It is evident that in order to obtain the best results, it is quite necessary to mix the aluminum powder or dust quite thoroughly with the air before the latter is inhaled and the nearer this mixture of air and aluminum approaches a colloidal state, the better are the results. It is impractical with a simple apparatus to effect the optimum uniformly of mixture, but the apparatus which forms the subject of this invention produces a mixture that is satisfactory.

In the drawing the apparatus which has been designated by numeral 4 in Figure 1 and has been shown in section in Figure 2, consists of an elongated box-like member having a straight top 5, flat sides 6 and a curved bottom 7. The top and bottom taper upwardly and are connected by an end wall 8 and a screen 9. The end wall 8 has an elongated rectangular opening in which is positioned a hopper having downwardly and inwardly tapered sides 10 and 11 whose lower ends are connected by a screen 12. A cover 13 is hinged to the upper end of wall 10 and is provided with one or more springs 14 that tend to retain the cover in the partly open position shown in Figure 2. By exerting pressure on cover 13, it can be moved into closed position.

Hinged to the outer edge of end wall 8 is a closure 15 that is held in partly open position by means of springs 16. The lower end wall 17 is provided with an opening for the reception of the nose and which opening is so shaped that it will fit snugly and form an air tight contact with the face when a reasonable amount of pressure is exerted.

Extending across the interior of the apparatus are a plurality of shelves, three being shown. The shelves have been designated by numbers 18, 19 and 20 and are attached at their ends to sides 6. The shelves have been shown as concave on their upper surfaces, which is preferable, but not essential.

Let us now assume that a person has a device like that shown in the drawing and above described and that he desires to inhale aluminum dust or powder. The aluminum powder is put into the hopper and rests on screen 12. The apparatus is now applied to the face in the manner shown in Figure 1 and held in position by one hand. Two fingers of the other hand are applied to the hinged covers 13 and 15 in such a way that the extent of their opening can be readily controlled. The party now inhales air and opens cover 13 sufficiently to permit a small amount of powder to pass through the screen and into the apparatus. Some of the powder will be entrained by the air and the remainder will fall onto shelf 20. On subsequent inhalations more powder may be admitted. If cover 13 is closed entirely, practically no powder will be fed into the air stream. If cover 13 is opened wide and cover 15 closed, a large amount of powder can be fed because there will then be a high pressure forcing air through the hopper. After a few trials, a user learns how to manipulate the covers 13 and 15 so as to get the best results. The shelves also serve to produce a turbulence of the air flowing through the compartment which results in a more uniform intermingling of the air and the dust.

By the simple device just described, which can be made of metal, paper or any suitable sheet material, anyone who has been exposed to silica dust during the day can inhale a quantity of aluminum dust sufficient to form an insoluble aluminum hydroxide coating on the silica particles which will prevent them from dissolving and forming an acid.

The apparatus is so simple that it can be made and sold at a price that will enable all who may need aluminum treatments to procure and own a device for its convenient and safe administration.

The exact shape of the device is immaterial, but it should be so constructed that it embodies a chamber entirely enclosed by walls; one wall must have an opening for receiving the nose, and an opening for the admission of air must be provided in another wall, preferably as far as possible away from the first mentioned opening. Means must be provided for feeding powdered aluminum into the air stream, preferably as near as possible to the inlet opening, and in addition means must be provided to cause the air to become greatly agitated in its passage whereby the powder will become thoroughly mixed with the air. In addition means should be provided for regulating the amount of powder mixed with the air and for this purpose covers 13 and 15 have been indicated as the most simple. The rate at which the powder is fed can be regulated by any known equivalent that can be substituted for the means shown.

Having described the invention what is claimed as new is:

1. An apparatus for use in inhaling aluminum powder which comprises, a box-like device having an opening in one wall for the reception of a person's nose, one wall having a hopper for the reception of aluminum powder, one wall having an opening for the admission of air, and means for proportioning the amount of air that enters through the hopper and through the air opening.

2. An apparatus for use in inhaling aluminum powder comprising, a box-like device, one wall having an opening for the reception of a person's nose, one wall having an opening for the reception of a hopper for aluminum powder, a hopper in the last named opening, one wall having an opening for the admission of air, and a plurality of shelves arranged in stepped relation, below the hopper, the several shelves being positioned between the opening for the nose and the opening for the admission of air.

3. An apparatus for use in inhaling aluminum powders, comprising, a box-like device, one wall having an opening for the reception of a person's nose, one wall having an opening for the reception of a hopper for aluminum powder, a hopper in the last named opening, one wall having an opening for the admission of air, a plurality of shelves arranged in stepped relation, below the hopper, the several shelves being positioned between the opening for the nose and the opening for the admission of air, and means associated with the hopper and the air inlet opening for proportioning the amount of air that enters through each.

4. An apparatus for use in inhaling aluminum powder which comprises, a hollow device having a compartment entirely enclosed by walls, one wall having an opening for the reception of a person's nose, a hopper positioned in an opening in one wall, the bottom of the hopper being formed by a screen, a movable closure for the top of the hopper, the wall farthest from the one having the opening for the nose, having an opening for the admission of air, means for varying the effective area of the last named opening, and means positioned in the compartment for turbulizing the air as it passes to the compartment.

5. An apparatus for use in inhaling aluminum powder which comprises, an elongated box-like member having a compartment entirely enclosed by walls, one end wall having an opening for the reception of a person's nose, the opposite end wall having an opening for the admission of air, a hopper for feeding aluminum powder, positioned in the upper wall between the two above mentioned openings, the bottom of the hopper having a screen, and means associated with the hopper and with the air inlet opening for proportioning the amount of air that enters through each.

6. An apparatus for use in inhaling aluminum powder which comprises, an elongated box-like member having a compartment entirely enclosed by walls, one end wall having an opening for the reception of a person's nose, the opposite end wall having an opening for the admission of air, a hopper for feeding aluminum powder positioned in the upper wall between the two above mentioned openings, the bottom of the hopper having a screen, means associated with the hopper and with the air inlet opening for proportioning the amount of air that enters through each, and means positioned in the chamber, between the hopper and the nose receiving opening for catching aluminum powder coming from the hopper and for turbulizing the air flowing through the compartment and thereby effecting a more thorough mixture of air and powder.

WALTER B. STEWART.